US012641158B2

(12) United States Patent
Huang

(10) Patent No.: US 12,641,158 B2
(45) Date of Patent: May 26, 2026

(54) DEVICE CONNECTION METHOD AND APPARATUS, ELECTRONIC DEVICE AND STORAGE MEDIUM

(71) Applicant: ZHEJIANG UNIVIEW TECHNOLOGIES CO., LTD., Hangzhou (CN)

(72) Inventor: Cheng Huang, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 63 days.

(21) Appl. No.: 18/870,214

(22) PCT Filed: Dec. 16, 2022

(86) PCT No.: PCT/CN2022/139451
§ 371 (c)(1),
(2) Date: Nov. 27, 2024

(87) PCT Pub. No.: WO2023/231373
PCT Pub. Date: Dec. 7, 2023

(65) Prior Publication Data
US 2025/0247451 A1 Jul. 31, 2025

(30) Foreign Application Priority Data
Jun. 1, 2022 (CN) .......................... 202210618481.7

(51) Int. Cl.
*H04L 67/141* (2022.01)
*H04L 41/0823* (2022.01)
(52) U.S. Cl.
CPC ........ *H04L 67/141* (2013.01); *H04L 41/0823* (2013.01)

(58) Field of Classification Search
CPC .......................... H04L 67/141; H04L 41/0823
(Continued)

(56) References Cited

U.S. PATENT DOCUMENTS 11,849,495 B2 * 12/2023 Abedini ............... H04W 72/23
2014/0313917 A1 10/2014 Jung et al.

FOREIGN PATENT DOCUMENTS

CN 107734032 A * 2/2018 ........... H04L 67/141
CN 109660411 A 4/2019
(Continued)

OTHER PUBLICATIONS

International Search Report in Application No. PCT/CN2022/139451, dated Mar. 9, 2023, 4 pages, including translation.

*Primary Examiner* — Zi Ye
(74) *Attorney, Agent, or Firm* — MASCHOFF BRENNAN

(57) ABSTRACT

A device connection method includes acquiring connection information between the application and the device, where the connection information includes fastest connection mark information, and the fastest connection mark information includes a marked connection mode for the fastest connection among concurrent connection modes; acquiring a connection mode with the largest proportion in the fastest connection mark information in a first predetermined period N and determining the connection mode with the largest proportion as a first connection mode; acquiring at least one connection mode that ranks top among connection modes sorted in descending order of proportion in the fastest connection mark information in a second predetermined period M and combining the at least one connection mode into a first set, where the number of the at least one connection mode that ranks top is a preset number, and M is greater than N.

13 Claims, 3 Drawing Sheets

(58) Field of Classification Search
USPC .......................................................... 709/227
See application file for complete search history.

(56)                    References Cited

FOREIGN PATENT DOCUMENTS

| CN | 109660441 A |   | 4/2019 |            |            |
|----|-------------|---|--------|------------|------------|
| CN | 110876162 A |   | 3/2020 |            |            |
| CN | 111200557 A | * | 5/2020 | ............ | H04L 69/14 |
| CN | 111770229 A |   | 10/2020 |           |            |
| CN | 113225233 A |   | 8/2021 |            |            |
| CN | 114422574 A | * | 4/2022 | ........... | H04L 67/146 |
| CN | 115037781 A |   | 9/2022 |            |            |

* cited by examiner

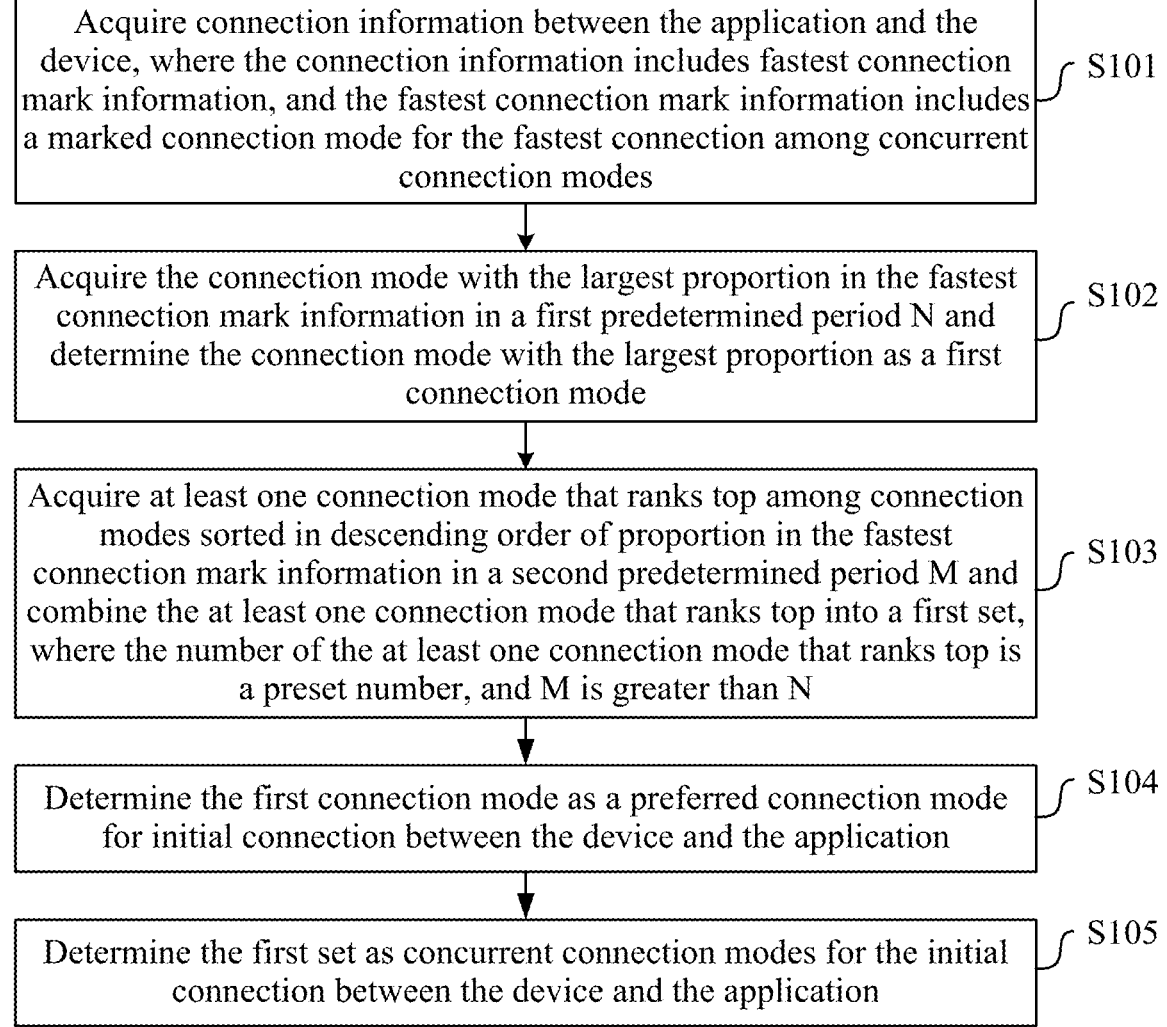

Acquire connection information between the application and the device, where the connection information includes fastest connection mark information, and the fastest connection mark information includes a marked connection mode for the fastest connection among concurrent connection modes ⟋ S101

Acquire the connection mode with the largest proportion in the fastest connection mark information in a first predetermined period N and determine the connection mode with the largest proportion as a first connection mode ⟋ S102

Acquire at least one connection mode that ranks top among connection modes sorted in descending order of proportion in the fastest connection mark information in a second predetermined period M and combine the at least one connection mode that ranks top into a first set, where the number of the at least one connection mode that ranks top is a preset number, and M is greater than N ⟋ S103

Determine the first connection mode as a preferred connection mode for initial connection between the device and the application ⟋ S104

Determine the first set as concurrent connection modes for the initial connection between the device and the application ⟋ S105

FIG. 1

Acquire switching connection information in the current connection period after successful initial connection between the device and the application, where the switching connection information includes the connection success rate, connection period duration K1, connection count C1, and connection duration proportion of a connection mode after switching connection in the connection period; one time unit contains at least one connection period; and one connection period contains at least one connection    ⌐ S106

Optimize the connection period duration K1 of the target connection mode based on the connection duration proportion and the connection success rate in the current connection period to obtain the connection period duration K of the target connection mode in the next connection period; and optimize the connection count C1 of the target connection mode to obtain the connection count C of the target connection mode in the next connection period, where the target connection mode is a switching connection mode in the current connection period after the successful initial connection between the device and the application    ⌐ S107

FIG. 2

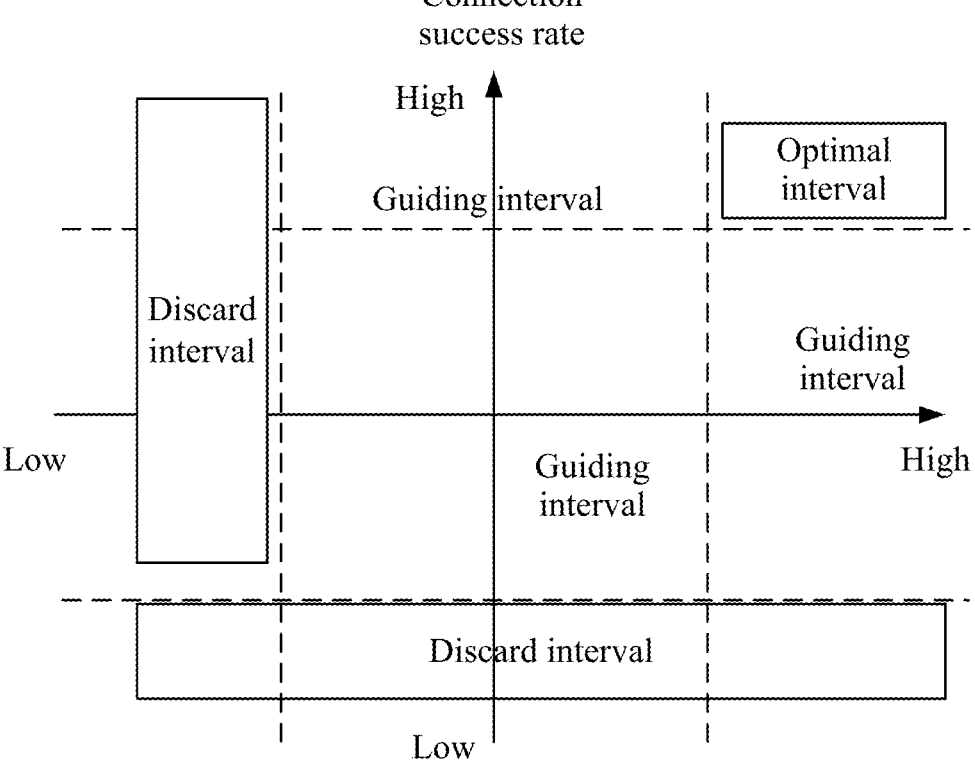

FIG. 3

DEVICE CONNECTION METHOD AND APPARATUS, ELECTRONIC DEVICE AND STORAGE MEDIUM

CROSS REFERENCE TO RELATED APPLICATIONS

This application is a national stage application filed under 35 U.S.C. 371 based on International Patent Application No. PCT/CN2022/139451, filed on Dec. 16, 2022, which claims priority to Chinese Patent Application No. 202210618481.7 filed with the China National Intellectual Property Administration (CNIPA) on Jun. 1, 2022, the disclosures of which are incorporated herein by reference in their entireties.

TECHNICAL FIELD

The present application relates to the field of device interconnection, for example, a device connection method and apparatus, an electronic device, and a storage medium.

BACKGROUND

With the rapid development of the Internet of Things (IoT), there are an increasing number of applications available for everyday use, and more IoT devices, such as video surveillance cameras, provide services like network communication and streaming over public networks. In related technologies, an application and a device are connected in various manners, such as direct connection, tunnel connection, or forwarding connection. These are commonly used techniques that have different underlying principles, resulting in different connection speeds and connection success rates.

Direct connection refers to the situation where an application and a device are on the same local area network, allowing for direct and rapid access without the need for a cloud server as an intermediary. This method is fast and efficient. Both tunnel connection and forwarding connection require a cloud server as an intermediary to provide end-to-end connectivity between the application and the device. Tunnel connection typically consumes a small number of network resources on the cloud server, with average connection success rates and stability. Tunnel connection can be implemented using the Transmission Control Protocol (TCP) or the User Datagram Protocol (UDP). However, using TCP often leads to message congestion due to its general stability, making UDP a more suitable choice. For-warding connection consumes more network resources on the cloud server but offers better connection success rates and stability. Forwarding connection can also be implemented using the TCP or the UDP. When the UDP is used in forwarding connection, the overall stability may decrease due to the UDP reliability problem.

The intelligence level of the connection mode between an application and a device is relatively low, leading to one or more of the following problems: low connection speed, low success rate, and high resource consumption. In this scenario of hybrid networking, how to configure a device connection method to enhance the intelligence level has become a challenge to address.

SUMMARY

The present application provides a device connection method and apparatus, an electronic device, and a storage medium to enhance the intelligence level of device connection.

In a first aspect, the present application provides a device connection method. The device connection method is applied to connection between a device and an application.

The device connection method includes acquiring connection information between the application and the device, where the connection information includes fastest connection mark information, and the fastest connection mark information includes a marked connection mode for the fastest connection among concurrent connection modes; acquiring a connection mode with the largest proportion in the fastest connection mark information in a first predetermined period N and determining the connection mode with the largest proportion as a first connection mode; acquiring at least one connection mode that ranks top among connection modes sorted in descending order of proportion in the fastest connection mark information in a second predetermined period M and combining the at least one connection mode into a first set, where the number of the at least one connection mode that ranks top is a preset number, and M is greater than N; determining the first connection mode as a preferred connection mode for the initial connection between the device and the application; and determining the first set as concurrent connection modes for the initial connection between the device and the application.

In a second aspect, the present application provides a device connection apparatus. The device connection apparatus includes an acquisition module, a data processing module, and a control module.

The acquisition module is configured to acquire connection information between an application and a device.

The data processing module is configured to generate a preferred connection mode and concurrent connection modes for initial connection between the device and the application based on the connection information and update a switching connection strategy for the device and the application based on switching connection information.

The control module is configured to control the device to connect to the application based on the preferred connection mode, the concurrent connection modes, and the switching connection strategy.

In a third aspect, the present application provides an electronic device. The electronic device includes a memory, a processor, and a computer program stored in the storage medium of the memory and executable on the processor. When executing the computer program, the processor performs the device connection method.

In a fourth aspect, the present application provides a storage medium storing a computer program which, when executed by a processor, causes the processor to perform the device connection method.

BRIEF DESCRIPTION OF DRAWINGS

FIG. 1 is a flowchart of a device connection method according to an embodiment of the present application.

FIG. 2 is a flowchart of part of a device connection method according to an embodiment of the present application.

FIG. 3 is a diagram illustrating the structure of a matrix model according to an embodiment of the present application.

DETAILED DESCRIPTION

Figures 4, 5:
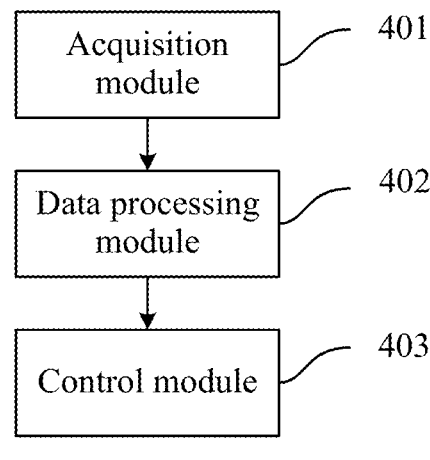
FIG. 4 is a diagram illustrating the structure of a device connection apparatus according to an embodiment of the present application.
FIG. 5 is a diagram illustrating the structure of an electronic device according to an embodiment of the present application.

The present application is described hereinafter in conjunction with drawings and embodiments. Such description is illustrative. Additionally, the description of well-known structures and technologies is omitted hereinafter:

The described embodiments are part of embodiments of the present application.

In the description of the present application, the terms "first" and "second" are used for the purpose of distinction.

In related technologies, a device terminal initiates a connection request to an application device by using multiple concurrent connection modes simultaneously. Connection is established using the mode in which the connection is achieved first. This method boasts fast connection speed and high efficiency but consumes a significant amount of network resources, making it challenging to establish multiple concurrent connections. When a connection mode fails to connect or has a connection success rate lower than a set threshold, this method cannot save bandwidth and leads to unnecessary consumption of substantial system resources. Given that the connection environment conditions between the application device and the device terminal differ, employing a uniform connection strategy results in excessive resource consumption throughout the system. For example, if the success rate of the tunnel connection (point-to-point (P2P) connection) between the application device and the device terminal is extremely low, using forwarding connection and tunnel connection concurrently results in considerable resource consumption at each node (for example, application device, device terminal, cloud server) in the tunnel connection link.

In related technologies, the most recent connection mode between the application device and the device terminal is retrieved and compared with a preset first-priority connection mode to determine which connection mode is to be used for connecting the application device and the device terminal. For example, if the tunnel connection is the first-priority connection mode, the most recent connection mode is forwarding, and the tunnel connection can also be established, the connection mode is saved as the tunnel connection for the next connection. If the tunnel connection fails, then the forwarding connection is saved for the next connection. While saving the most recent connection mode for the next connection can significantly increase the connection success rate, the efficiency of the connection may be poor. This method focuses solely on whether the connection can be successful and neglects the connection speed, failing to provide an enhanced user experience during the connection process. For example, if the first-priority connection mode between the application device and the device terminal is the tunnel connection and the tunnel connection can succeed, but the tunnel connection is slow, then each connection attempt between the application device and the device terminal consumes a considerable amount of time.

FIG. 1 is a flowchart of a device connection method according to an embodiment of the present application.

As shown in FIG. 1, the device connection method of this embodiment of the present application is applied to a server. The device connection method includes S101 to S105.

In S101, connection information between the application and the device is acquired, where the connection information includes fastest connection mark information, and the fastest connection mark information includes a marked connection mode for the fastest connection among concurrent connection modes.

In this embodiment, the connection information indicates the historical connection data between the application and the device. Both the application and the device access the public network and are managed using the cloud server. The cloud server assigns a cloud account and password to the application and the device. During the initial setup of the system, the application and the device attempt to connect using multiple concurrent connection modes, establishing the connection using the first successful connection mode. The application reports the successful connection information to the cloud server for storage. This information includes the cloud account, device identification information, type of connection mode, connection time, and the fastest connection mark.

In S102, the connection mode with the largest proportion in the fastest connection mark information in a first predetermined period N is acquired and determined as a first connection mode.

In this embodiment, the proportion of a type of connection mode refers to the ratio of the number of this type of connection mode to the total number of connection modes in the fastest connection mark information. The first connection mode is a type of connection mode in the fastest connection mark information in the first predetermined period N, where the number of the first connection mode is larger than the number of any other type of connection mode in the fastest connection mark information in the first predetermined period N.

In S103, at least one connection mode that ranks top among connection modes sorted in descending order of proportion in the fastest connection mark information in a second predetermined period M is acquired and combined into a first set, where the number of the at least one connection mode that ranks top is a preset number, and M is greater than N.

In an embodiment, N represents the duration of the first predetermined period, and M represents the duration of the second predetermined period. The units of N and M may be years, months, or days or may be hours, minutes, or seconds. The units of N and M may be the same or different. For example, N may be 3 days, and M may be 15 days; N may be 1 hour, and M may be 5 hours; or N may be 1 month, and M may be 3 months. The ratio of N to M may be 1/3, 1/5, or 1/10.

In S104, the first connection mode is determined as a preferred connection mode for initial connection between the device and the application.

In this embodiment, the initial connection refers to the first connection between the application and the device after they have been disconnected.

In S105, the first set is determined as concurrent connection modes for the initial connection between the device and the application.

The method of this embodiment can be applied to connection initiated by the application to the device or connection initiated by the device to the application. In this embodiment, the cloud server sends the preferred connection mode and the concurrent connection modes to the application, enabling the application to attempt to establish a connection to the device by using the preferred connection mode and the concurrent connection modes.

The device connection method of this embodiment of the present application is configured to extract connection modes for two predetermined periods, enabling comprehensive comparison and selection of the connection efficiencies between multiple connection modes, avoiding the influence of sporadic conditions on the selection of connection modes, improving the connection success rate and connection efficiency for the initial connection between the application and the device, and enhancing the intelligence level of the initial connection.

In some embodiments, before S105, the method also includes determining whether the connection mode with the largest proportion in the fastest connection mark information in the second predetermined period M is the same as the first connection mode to obtain a first determination result; if the first determination result is yes, determining whether the proportion difference between the top two connection modes in the fastest connection mark information in the second predetermined period M exceeds a predetermined threshold to obtain a second determination result; if the first determination result is no, S105 of determining the first set as the concurrent connection modes for the initial connection between the device and the application is performed; if the second determination result is yes, abandoning determining the first set as the concurrent connection modes for the initial connection between the device and the application; and if the second determination result is no, S105 of determining the first set as the concurrent connection modes for the initial connection between the device and the application is performed.

In this embodiment, when both determination results are yes, the first connection mode has advantages over other connection modes, and only the first connection mode is used as the initial connection mode between the application and the device, thereby balancing the connection success rate and the connection efficiency.

If the first determination result is no, connection between the device and the application is attempted using the preferred connection mode while connection between the device and the application is attempted using concurrent connection modes in the first set.

If the second determination result is no, connection between the device and the application is attempted using the preferred connection mode while connection between the device and the application is attempted using concurrent connection modes in the first set.

If at least one of the two determination results is no, the first connection mode does not have advantages over other connection modes, and the concurrent connection method is used, thereby improving the connection success rate and the connection efficiency.

In some embodiments, before S105, the method also includes determining whether the available network resources are greater than a preset value; and if the available network resources are not greater than the preset value, abandoning determining the first set as the concurrent connection modes for the initial connection between the device and the application.

In this embodiment, when the available network resources are insufficient, concurrent connections are abandoned, and the connection is established by preferably using the first connection mode, thereby adapting to the actual application environment and improving the intelligence level of the connection.

In some embodiments, after the connection information applied to the device is acquired, the following is performed: abandoning determining a connection mode in which the connection duration proportion in the current connection period is less than a first preset threshold as a switching connection mode in the next connection period; or abandoning determining a connection mode in which the connection success rate in the current connection period is less than a second preset threshold as a switching connection mode in the next connection period. In this embodiment, the first preset threshold may be 1%, 2%, or 3%, and the second preset threshold may be 1%, 2%, or 3%.

FIG. 2 is a flowchart of part of a device connection method according to an embodiment of the present application. As shown in FIG. 2, in some embodiments, after step S105, the method also includes S106 and S107.

In S106, switching connection information in the current connection period after successful initial connection between the device and the application is acquired, where the switching connection information includes the connection success rate, connection period duration K1, connection count C1, and connection duration proportion of a connection mode after switching connection in the connection period; one time unit contains at least one connection period; and one connection period contains at least one connection.

In this embodiment, the switched connection mode is the target connection mode. The resource consumption of the target connection mode in the time unit is lower than that of the connection mode before switching. The connection period duration K1 may be expressed in years, months, or days or expressed in hours, minutes, or seconds. The connection count C1 is an integer greater than or equal to 0. K1 may be 5 minutes with C1 being 10, or K1 may be 1 hour with C1 being 100. During a single connection period with duration K1, the application and the device attempt to switch the connection mode to the target connection mode until the switch is successful. The number of attempts in the single connection period is C1. The cloud server retrieves the switching connection information from the application.

In S107, the connection period duration K1 of the target connection mode is optimized based on the connection duration proportion and the connection success rate in the current connection period to obtain the connection period duration K of the target connection mode in the next connection period; and the connection count C1 of the target connection mode is optimized to obtain the connection count C of the target connection mode in the next connection period, where the target connection mode is a switching connection mode in the current connection period after the successful initial connection between the device and the application.

In this embodiment, the cloud server generates the connection period duration K and the connection count C for the next connection period based on the switching connection information of the current connection period. The connection period duration and the connection count of the target connection mode for the next connection period are updated to K and C respectively. The switching connection strategy is that during a single connection period with duration K, the application and the device attempt to switch the connection mode to the target connection mode until the switch is successful. The number of attempts in the single connection period is C.

In this embodiment, after the initial successful connection between the application and the device, the system switches the connection mode to reduce system resource consumption. The cloud server retrieves the switching connection information by using the application, generates the switching connection strategy based on the switching connection information, and sends the switching connection strategy to the application. The application switches the connection mode based on the switching connection strategy.

The device connection method of this embodiment periodically retrieves the switching connection information and iteratively updates the switching connection mode, helping to reduce system resource consumption and improve the switching efficiency and switching success rate of the connection mode.

In some embodiments, C1 is optimized based on the connection duration proportion corresponding to the current connection period to obtain C. When the connection duration proportion corresponding to the current connection period is greater than or equal to the upper duration limit, C1 is assigned to C. In this embodiment, the connection duration proportion is the ratio of the connection duration of the switched target connection mode to the connection period duration K. The upper duration limit may be 75%, 80%, or 90%. When the connection duration proportion corresponding to the current connection period is greater than or equal to the upper duration limit, the connection duration proportion is within the optimal threshold range, and no optimization of the connection count is required.

When the connection duration proportion corresponding to the current connection period is greater than or equal to the lower duration limit and less than the upper duration limit, a*C1 is assigned to C. In an embodiment, a is greater than 1, and a may be 1.5, 1.8, or 2. The larger the connection duration proportion corresponding to the current connection period, the smaller a. In this embodiment, the lower duration limit may be 10%, 5%, or 15%. When the connection duration proportion corresponding to the current connection period is greater than or equal to 10% and less than or equal to 75%, the resources saved by switching the connection mode exceed the resources consumed by the switch. Increasing the connection count helps improve the connection duration proportion of the switched connection mode in the next connection period, thereby increasing the amount of system resources saved.

When the connection duration proportion corresponding to the current connection period is less than the lower duration limit, b*C1 is assigned to C. b is less than a. b may be 0, 0.5, or 0.3. When the connection duration proportion corresponding to the current connection period is less than 10%, the resources consumed by switching the connection mode exceed the resources saved by switching the connection mode. In this case, the connection count in the next connection period is reduced or set to 0 to avoid resource waste.

The device connection method of this embodiment takes into account both the resources consumed before successfully switching the connection mode and the resources saved after the successful switch; and adjusts the connection count to avoid resource waste.

In some embodiments, optimizing K1 to obtain the connection period duration K for the next connection period includes optimizing K1 based on the connection duration proportion and the connection success rate corresponding to the current connection period to obtain K.

When the connection success rate corresponding to the current connection period is greater than or equal to the upper success rate limit, K1 is assigned to K. In this embodiment, the upper success rate limit may be 70%, 80%, or 90%. When the connection success rate corresponding to the current connection period is greater than 70%, the connection success rate is within the optimal threshold range, and no optimization of the connection period duration is required.

When the connection success rate corresponding to the current connection period is greater than or equal to the lower success rate limit and less than the upper success rate limit, it is determined whether the connection duration corresponding to the current connection period is less than the preset proportion. If the connection duration corresponding to the current connection period is less than the preset proportion, c*K1 is assigned to K. In this embodiment, c is less than 1. c may be 0.3, 0.5, or 0.8. The larger the connection success rate, the larger c. If the connection duration corresponding to the current connection period is not less than the preset proportion, d*K1 is assigned to K. In this embodiment, d is greater than 1. d may be 1.2, 1.5, or 1.8. The larger the connection success rate, the smaller d. The lower success rate limit may be 10%, 8%, or 5%. The preset proportion is greater than the lower success rate limit and less than the upper success rate limit. The preset proportion may be 50%, 55%, or 60%. In this embodiment, when the connection success rate corresponding to the current connection period is greater than or equal to 10% and less than 70%, it is determined whether the connection duration proportion is less than 50%. If the connection duration proportion is not less than 50%, the benefits of switching the connection are relatively high, and the connection period duration is increased inversely based on the connection success rate to increase the connection success rate. If the connection duration proportion is less than 50%, the benefits of switching the connection are relatively low, and the connection period duration is reduced based on the success rate to minimize the resource and performance costs caused by multiple connection switches.

When the connection success rate corresponding to the current connection period is less than the lower success rate limit, e*K1 is assigned to K. e is less than c. e may be 0.2, 0.1, or 0. In this embodiment, when the connection success rate is less than 10%, the resources consumed before the successful connection switch are greater than the resources saved after the successful connection switch. Therefore, the connection period duration is reduced or set to 0 to avoid resource waste.

The device connection method of this embodiment takes into account both the resources consumed before successfully switching the connection mode and the resources saved after the successful switch; and adjusts the connection period duration to avoid resource waste.

FIG. 3 is a diagram illustrating the structure of a matrix model according to an embodiment of the present application. As shown in FIG. 3, in some embodiments, a matrix model is established based on the connection duration proportion and the connection success rate of the target connection mode. The horizontal axis represents the connection duration proportion. The vertical axis represents the connection success rate. The connection duration proportion and the connection success rate are divided into intervals with different gradients, resulting in three intervals.

The optimal interval: occurs when the connection duration proportion is greater than or equal to the upper duration limit, and the connection success rate is greater than or equal to the upper success rate limit. The optimal interval may be set according to system requirements. In some embodiments, the interval where the connection duration proportion is greater than or equal to 75% and the connection success rate is greater than or equal to 70% is considered the optimal interval. When both the connection duration proportion and the connection success rate fall within the optimal interval, it is determined that the default parameters for the target connection mode (connection period duration K and connection count C) are not required to be changed.

The discard interval (or worst interval): is defined when the connection duration proportion is less than the lower duration limit, or the connection success rate is less than the lower success rate limit. The discard interval may be set according to system requirements. In some embodiments, the interval where the connection duration proportion is less than 10% or the connection success rate is less than 10% is strategically discarded, and no switching to this target connection mode is performed.

The guiding interval: consists of all other intervals outside the optimal interval and the discard interval. The purpose of the guiding interval is to achieve the optimal interval by adjusting the connection period duration K and the connection count C within this interval to achieve refined guidance.

The cloud server sends the connection period duration K and connection count C to the application, enabling the application to initiate a switching connection to the device based on the connection period duration K and connection count C.

In an embodiment, the current connection mode between the application and the device is a forwarding connection, and the switching connection mode is a tunneling connection. Based on Table 1, the connection count C for the tunneling connection in the next connection period is optimized based on the connection duration proportion of the tunneling connection in the first connection period after the switch to obtain C1. C1 represents the connection count for the tunneling connection in the next connection period.

TABLE 1

| Connection Duration Proportion T | Optimized Connection Count C1 |
| --- | --- |
| T < 10% | 0 |
| 10% ≤ T < 50% | 2 * C |

TABLE 1-continued

| Connection Duration Proportion T | Optimized Connection Count C1 |
| --- | --- |
| 50% ≤ T < 75% | 1.5 * C |
| T ≥ 75% | 1 * C |

When the connection duration proportion T is greater than or equal to 50%, the connection period duration K is optimized based on Table 2 to obtain K1. K1 denotes the connection period duration for the tunnel connection in the next connection period.

TABLE 2

| Connection Success Rate P | Optimized Connection Period Duration K1 |
| --- | --- |
| P < 10% | 0 |
| 10% ≤ P < 30% | 4 * K |
| 30% ≤ P < 70% | 2 * K |
| P ≥ 70% | 1 * K |

TABLE 3

| Success Rate P | Optimized Connection Period Duration K1 |
| --- | --- |
| P < 10% | 0 |
| 10% ≤ P < 30% | $0.5 * K_1$ |
| 30% ≤ P < 70% | $0.8 * K_1$ |
| P ≥ 70% | $1 * K_1$ |

By combining Table 1, Table 2, and Table 3, a complete switching connection strategy model is obtained, as shown in Table 4.

TABLE 4

| Interval | Connection Duration Proportion T | Connection Success Rate P | Optimized Connection Count C1 | Optimized Connection Period Duration K1 |
| --- | --- | --- | --- | --- |
| Discard interval | T < 10% | P < 10% | 0 | 0 |
| Discard interval | T < 10% | 10% ≤ P < 30% | 0 | 0.5 * K |
| Discard interval | T < 10% | 30% ≤ P < 70% | 0 | 0.8 * K |
| Discard interval | T < 10% | P ≥ 70% | 0 | 1 * K |
| Discard interval | 10% ≤ T < 50% | P < 10% | 2 * C | 0 |
| Guiding interval | 10% ≤ T < 50% | 10% ≤ P < 30% | 2 * C | 4 * K |
| Guiding interval | 10% ≤ T < 50% | 30% ≤ P < 70% | 2 * C | 2 * K |
| Guiding interval | 10% ≤ T < 50% | P ≥ 70% | 2 * C | 1 * K |
| Discard interval | 50% ≤ T < 75% | P < 10% | 1.5 * C | 0 |
| Guiding interval | 50% ≤ T < 75% | 10% ≤ P < 30% | 1.5 * C | 0.5 * K |
| Guiding interval | 50% ≤ T < 75% | 30% ≤ P < 70% | 1.5 * C | 0.8 * K |
| Guiding interval | 50% ≤ T < 75% | P ≥ 70% | 1.5 * C | 1 * K |
| Discard interval | T ≥ 75% | P < 10% | 1 * C | 0 |

TABLE 4-continued

| Interval | Connection Duration Proportion T | Connection Success Rate P | Optimized Connection Count C1 | Optimized Connection Period Duration K1 |
|---|---|---|---|---|
| Guiding interval | T ≥ 75% | 10% ≤ P < 30% | 1 * C | 4 * K |
| Guiding interval | T ≥ 75% | 30% ≤ P < 70% | 1 * C | 2 * K |
| Optimal interval | T ≥ 75% | P ≥ 70% | 1 * C | 1 * K |

For example, if the ratio of the tunnel connection duration to the unit time is 75% and the tunnel connection success rate during the switching process is 50%, it is considered that the benefits from switching are high. In this case, the connection period may be increased to improve the success rate, with the expectation of quickly establishing a successful connection and obtaining higher benefits. If the success rate is 25%, the increase in the connection period duration should be greater than that when the success rate is 50% to enhance the success rate and achieve better outcomes.

If the ratio of the tunnel connection duration to the unit time after switching is 20% and the success rate during the switching process remains at 50%, it is considered that the benefits from switching are not high. Therefore, the connection period duration and the connection count may be reduced to minimize performance consumption for both the application and the cloud server.

If the ratio of the tunnel connection duration to the unit time after switching is less than 10% and the success rate is also below 10%, the benefits from switching are seen as low, or the success rate is unsatisfactory. In this case, the connection period duration or the connection count is set to 0, thereby avoiding concurrent connections and unnecessary performance consumption from concurrent connections.

The device connection method of the present application allows the cloud service to generate the switching connection strategy by using a data analysis module and allows an instruction sending module to send the switching connection strategy to the application. Upon receiving the switching connection strategy, the application attempts to switch to the target connection mode within a connection period of duration K until the connection succeeds, with the number of attempts during each connection period being C. The cloud server periodically retrieves the switching connection information and periodically updates K and C. Additionally, the multiples by which K and C increase or decrease can be set in the cloud server. The multiples for C1 and K1 presented in the tables are illustrative.

The distinction from related technologies lies in the fact that the cloud server analyzes the recorded information during the switching process between the application and the device, constructs a matrix model, and updates the switching connection strategy based on the duration proportion of the switched connection mode and the success rate during the switching process.

The benefits derived from this approach include the adaptive generation of targeted concurrent strategies based on the different network conditions of the application and the device. This leads to a more precise balance between performance consumption and the benefits gained from switching, thereby effectively enhancing the advantages obtained from the switching while avoiding unnecessary performance consumption for both the application and the cloud server.

FIG. 4 is a diagram illustrating the structure of a device connection apparatus according to an embodiment of the present application.

As shown in FIG. 4, based on the same concept, the device connection apparatus of this embodiment of the present application includes an acquisition module 401, a data processing module 402, and a control module 403.

The acquisition module 401 is configured to acquire connection information between an application and a device.

The data processing module 402 is configured to generate a preferred connection mode and concurrent connection modes for the initial connection between the device and the application based on the connection information and update a switching connection strategy for the device and the application based on switching connection information.

In this embodiment, the data processing module 402 is configured to generate the preferred connection mode, the concurrent connection modes, and the switching connection strategy for the initial connection between the device and the application by using the device connection method of any previous embodiment.

The control module 403 is configured to control the device to connect to the application based on the preferred connection mode, the concurrent connection modes, and the switching connection strategy.

In some embodiments, the acquisition module 401 includes a first acquisition unit, a second acquisition unit, and a third data acquisition unit; and the data processing module 402 includes a first data processing unit and a second data processing unit.

The first acquisition unit is configured to acquire connection information between the application and the device, where the connection information includes fastest connection mark information, and the fastest connection mark information includes a marked connection mode for the fastest connection among concurrent connection modes.

The second acquisition unit is configured to acquire a connection mode with the largest proportion in the fastest connection mark information in a first predetermined period N and determine the connection mode with the largest proportion as a first connection mode.

The third acquisition unit is configured to acquire at least one connection mode that ranks top among connection modes sorted in descending order of proportion in the fastest connection mark information in a second predetermined period M and combine the at least one connection mode into a first set, where the number of the at least one connection mode that ranks top is a preset number, and M is greater than N.

The first data processing unit is configured to determine the first connection mode as a preferred connection mode for the initial connection between the device and the application.

US 12,641,158 B2

13

The second data processing unit is configured to determine the first set as concurrent connection modes for the initial connection between the device and the application.

The device connection apparatus of this embodiment of the present application is configured to extract connection modes for two predetermined periods, enabling comprehensive comparison and selection of the connection efficiencies between multiple connection modes, avoiding the influence of sporadic conditions on the selection of connection modes, improving the connection success rate and connection efficiency for the initial connection between the application and the device, and enhancing the intelligence level of the initial connection.

In some embodiments, the acquisition module 401 also includes a fourth acquisition unit, and the data processing module 402 also includes a third data processing unit.

The fourth acquisition unit is configured to acquire switching connection information in the current connection period after successful initial connection between the device and the application. The switching connection information includes the connection success rate, connection period duration K1, connection count C1, and connection duration proportion of a connection mode after switching connection in the connection period. One time unit contains at least one connection period contains at least one connection. One connection period contains at least one connection.

The third data processing unit is configured to optimize the connection period duration K1 of a target connection mode based on the connection duration proportion and the connection success rate in the current connection period to obtain the connection period duration K of the target connection mode in the next connection period; and optimize the connection count C1 of the target connection mode to obtain the connection count C of the target connection mode in the next connection period. The target connection mode is a switching connection mode in the current connection period after the successful initial connection between the device and the application.

The device connection apparatus of this embodiment of the present application comprehensively considers the resources consumed before successfully switching the connection mode and the resources saved after successfully switching the connection mode and adjusts the connection period duration to avoid resource waste.

As shown in FIG. 5, the electronic device of this embodiment of the present application includes a memory 10, a processor 20, and a computer program stored in the storage medium of the memory 10 and executable on the processor 20. When executing the computer program, the processor 20 performs the device connection method of any previous embodiment.

An embodiment of the present application provides a storage medium storing computer-executable instructions which, when executed by a computer processor, cause the computer processor to execute the device connection method of any previous embodiment. The storage medium may be, for example, a magnetic disk, an optical disk, a read-only memory (ROM), or a random-access memory (RAM). The storage medium may be a non-transitory storage medium.

It is to be understood by those skilled in the art that embodiments of the present application may be provided as methods, systems, or computer program products. Therefore, the present application may take the form of an entirely hardware embodiment, an entirely software embodiment or an embodiment combining software and hardware aspects. Moreover, the present application may take the form of a computer program product implemented on one or more computer-usable storage media (including a disk memory, a compact disc read-only memory (CD-ROM), an optical memory, etc.) that include computer-usable program codes.

The present application is described with reference to flowcharts and/or block diagrams of methods, devices (systems), and computer program products according to embodiments of the present application. It is to be understood that each flow and/or block in the flowcharts and/or block diagrams and a combination of flows and/or blocks in the flowcharts and/or block diagrams may be implemented by computer program instructions. These computer program instructions may be provided to a processor of a general-purpose computer, a special-purpose computer, an embedded processor, or another programmable data processing device to produce a machine so that instructions executed by the processor of the computer or another programmable data processing device create an apparatus for implementing functions specified in one or more flows in the flowcharts and/or in one or more blocks in the block diagrams.

These computer program instructions may also be stored in a computer-readable memory which can direct a computer or another programmable data processing device to operate in a particular manner so that instructions stored in the computer-readable memory create an article of manufacture including an instructing apparatus for implementing functions specified in one or more flows in the flowcharts and/or in one or more blocks in the block diagrams.

These computer program instructions may also be loaded onto a computer or another programmable data processing device so that a series of operation steps are performed on the computer or another programmable device to produce processing implemented by the computer. Therefore, instructions executed on the computer or another programmable device provide steps for implementing functions specified in one or more flows in the flowcharts and/or in one or more blocks in the block diagrams.

What is claimed is:

1. A device connection method, the method being applied to connection between a device and an application and the method comprising:

acquiring connection information between the application and the device, wherein the connection information comprises fastest connection mark information, and the fastest connection mark information comprises a marked connection mode for fastest connection among concurrent connection modes;

acquiring a connection mode with a largest proportion in the fastest connection mark information in a first predetermined period N and determining the connection mode with the largest proportion as a first connection mode;

acquiring at least one connection mode that ranks top among connection modes sorted in descending order of proportion in the fastest connection mark information in a second predetermined period M and combining the at least one connection mode into a first set, wherein a number of the at least one connection mode that ranks top is a preset number, and M is greater than N;

determining the first connection mode as a preferred connection mode for initial connection between the device and the application; and determining the first set as concurrent connection modes for the initial connection between the device and the application.

2. The device connection method of claim 1, before determining the first set as the concurrent connection modes for the initial connection between the device and the application, the method further comprising:

determining whether a connection mode with a largest proportion in the fastest connection mark information in the second predetermined period M is the same as the first connection mode;

in response to determining that the connection mode with the largest proportion in the fastest connection mark information in the second predetermined period M is the same as the first connection mode, determining whether a proportion difference between top two connection modes among the connection modes sorted in descending order of proportion in the fastest connection mark information in the second predetermined period M exceeds a predetermined threshold; and in response to determining that the proportion difference between the top two connection modes among the connection modes sorted in descending order of proportion in the fastest connection mark information in the second predetermined period M exceeds the predetermined threshold, abandoning determining the first set as the concurrent connection modes for the initial connection between the device and the application.

3. The device connection method of claim 2, further comprising:

in response to determining that the connection mode with the largest proportion in the fastest connection mark information in the second predetermined period M is different from the first connection mode, attempting to connect the device and the application by using the preferred connection mode while concurrently attempting to connect the device and the application by using connection modes in the first set.

4. The device connection method of claim 3, further comprising:

acquiring switching connection information in a current connection period after successful initial connection between the device and the application, wherein the switching connection information comprises a connection success rate, connection period duration K1, a connection count C1, and a connection duration proportion of a connection mode after switching connection in a connection period; one time unit contains at least one connection period; and one connection period contains at least one connection; and optimizing connection period duration K1 of a target connection mode based on the connection duration proportion and the connection success rate in the current connection period to obtain a connection period duration K of the target connection mode in a next connection period;

and optimizing a connection count C1 of the target connection mode to obtain a connection count C of the target connection mode in the next connection period, wherein the target connection mode is a switching connection mode in the current connection period after the successful initial connection between the device and the application.

5. The device connection method of claim 2, further comprising:

in response to determining that the proportion difference between the top two connection modes among the connection modes sorted in descending order of proportion in the fastest connection mark information in the second predetermined period M does not exceed the predetermined threshold, attempting to connect the device and the application by using the preferred connection mode while concurrently attempting to connect the device and the application by using connection modes in the first set.

6. The device connection method of claim 5, further comprising:

acquiring switching connection information in a current connection period after successful initial connection between the device and the application, wherein the switching connection information comprises a connection success rate, connection period duration K1, a connection count C1, and a connection duration proportion of a connection mode after switching connection in a connection period; one time unit contains at least one connection period; and one connection period contains at least one connection; and optimizing connection period duration K1 of a target connection mode based on the connection duration proportion and the connection success rate in the current connection period to obtain a connection period duration K of the target connection mode in a next connection period; and optimizing a connection count C1 of the target connection mode to obtain a connection count C of the target connection mode in the next connection period, wherein the target connection mode is a switching connection mode in the current connection period after the successful initial connection between the device and the application.

7. The device connection method of claim 2, further comprising:

acquiring switching connection information in a current connection period after successful initial connection between the device and the application, wherein the switching connection information comprises a connection success rate, connection period duration K1, a connection count C1, and a connection duration proportion of a connection mode after switching connection in a connection period; one time unit contains at least one connection period; and one connection period contains at least one connection; and optimizing connection period duration K1 of a target connection mode based on the connection duration proportion and the connection success rate in the current connection period to obtain a connection period duration K of the target connection mode in a next connection period; and optimizing a connection count C1 of the target connection mode to obtain a connection count C of the target connection mode in the next connection period, wherein the target connection mode is a switching connection mode in the current connection period after the successful initial connection between the device and the application.

8. The device connection method of claim 1, further comprising:

acquiring switching connection information in a current connection period after successful initial connection between the device and the application, wherein the switching connection information comprises a connection success rate, connection period duration K1, a connection count C1, and a connection duration proportion of a connection mode after switching connection in a connection period; one time unit contains at least one connection period; and one connection period contains at least one connection; and optimizing connection period duration K1 of a target connection mode based on the connection duration proportion and the connection success rate in the current connection period to obtain a connection period duration K of the target connection mode in a next connection period; and optimizing a connection count C1 of the target connection mode to obtain a connection count C of the target connection mode in the next connection period, wherein the target connection mode is a switching connection mode in the current connection period after the successful initial connection between the device and the application.

9. The device connection method of claim 8, wherein optimizing the connection count C1 of the target connection mode to obtain the connection count C of the target connection mode in the next connection period comprises:

optimizing C1 based on the connection duration proportion of the target connection mode in the current connection period to obtain C, wherein in response to the connection duration proportion of the target connection mode in the current connection period being greater than or equal to an upper duration limit, C1 is assigned to C; in response to the connection duration proportion of the target connection mode in the current connection period being greater than or equal to a lower duration limit and less than the upper duration limit, a*C1 is assigned to C, wherein as the connection duration proportion of the target connection mode in the current connection period increases, a decreases; and in response to the connection duration proportion of the target connection mode in the current connection period being less than the lower duration limit, b*C1 is assigned to C, wherein b is less than a.

10. The device connection method of claim 8, wherein optimizing the connection period duration K1 of the target connection mode to obtain the connection period duration K of the target connection mode in the next connection period comprises:

optimizing K1 based on the connection duration proportion of the target connection mode in the current connection period and the connection success rate of the target connection mode in the current connection period to obtain K, wherein in response to the connection success rate of the target connection mode in the current connection period being greater than or equal to an upper success rate limit, K1 is assigned to K;

in response to the connection success rate in the current connection period being greater than or equal to a lower success rate limit and less than the upper success rate limit, it is determined whether the connection duration proportion in the current connection period is less than a preset proportion; in response to determining that the connection duration proportion in the current connection period is less than the preset proportion, c*K1 is assigned to K, wherein as the connection success rate increases, c increases; and in response to determining that the connection duration proportion in the current connection period is not less than the preset proportion, d*K1 is assigned to K, wherein as the connection success rate increases, d decreases; and in response to the connection success rate in the current connection period being less than the lower success rate limit, e*K1 is assigned to K, wherein e is less than c.

11. The device connection method of claim 8, further comprising:

abandoning determining a connection mode in which the connection duration proportion in the current connection period is less than a first preset threshold as a switching connection mode in the next connection period; or abandoning determining a connection mode in which the connection success rate in the current connection period is less than a second preset threshold as a switching connection mode in the next connection period.

12. An electronic device, comprising a memory, a processor, and a computer program stored in a storage medium of the memory and executable on the processor, wherein when executing the computer program, the processor performs;

acquiring connection information between the application and the device, wherein the connection information comprises fastest connection mark information, and the fastest connection mark information comprises a marked connection mode for fastest connection among concurrent connection modes;

acquiring a connection mode with a largest proportion in the fastest connection mark information in a first predetermined period N and determining the connection mode with the largest proportion as a first connection mode;

acquiring at least one connection mode that ranks top among connection modes sorted in descending order of proportion in the fastest connection mark information in a second predetermined period M and combining the at least one connection mode into a first set, wherein a number of the at least one connection mode that ranks top is a preset number, and M is greater than N;

determining the first connection mode as a preferred connection mode for initial connection between the device and the application; and determining the first set as concurrent connection modes for the initial connection between the device and the application.

13. A non-transitory storage medium storing a computer program which, when executed by a processor, causes the processor to perform the device connection method of claim 1.

* * * * *